US005802071A

United States Patent [19]
Fang et al.

[11] Patent Number: 5,802,071
[45] Date of Patent: Sep. 1, 1998

[54] MICRO-CONTROLLER WITH A BUILT-IN TEST CIRCUIT AND METHOD FOR TESTING THE SAME

[76] Inventors: I Liang Fang; Kuo Cheng Yu, both of No. 5, Creation RD. II. Science-Based Industrial Park, Hsinchu, Taiwan

[21] Appl. No.: 560,311

[22] Filed: Nov. 17, 1995

[51] Int. Cl.$^6$ .......................... G01R 31/28; G11C 29/00; G06F 11/00
[52] U.S. Cl. .................... 371/22.1; 371/22.5; 371/21.1; 395/183.06
[58] Field of Search ........................... 271/21.2, 22.6, 271/22.5, 22.1, 22.2, 183.06, 21.1

[56] References Cited

U.S. PATENT DOCUMENTS

| 4,520,440 | 5/1985 | Buonomo et al. | 364/200 |
| 4,672,534 | 6/1987 | Kaniya | 364/200 |
| 4,839,852 | 6/1989 | Knutsen | 364/900 |
| 5,073,891 | 12/1991 | Patel | 371/21.3 |
| 5,214,695 | 5/1993 | Arnold et al. | 380/4 |
| 5,379,342 | 1/1995 | Arnold et al. | 380/2 |

*Primary Examiner*—Hoa T. Nguyen

[57] ABSTRACT

An improved micro-controller with a built-in test circuit is disclosed. It contains: (a) a test-mode switching register for receiving an external instruction from a test instrument so to select a test mode and to switch the external instruction to a predetermined circuit according to a selected test mode; (b) a test control circuit electrically connected to the test-mode switching register for controlling a timing of the external instruction received from the test instrument; (c) a multiplexer electrically connected to the test control circuit to receive an output signal from the test control circuit; (d) a control circuit electrically connected to the multiplexer for receiving an output signal therefrom, wherein the control circuit decodes and executes the output signal from the multiplexer, and sends an executing result to the test instrument; (e) a test program memory electrically connected to the multiplexer for storing a built-in test program, so as to allow the micro-controller to be tested in an internal mode; (f) an application program memory for storing an application program; and (g) a ROM read-out device electrically connected to the multiplexer and the application program memory for reading program codes from the application program memory to facilitate the test instrument to make a comparison.

5 Claims, 4 Drawing Sheets

MICRO-CONTROLLER WITH A BUILT-IN TEST CIRCUIT AND METHOD FOR TESTING THE SAME

BACKGROUND OF THE INVENTION

1. Field of the Invention

This invention relates to a novel IC (integrated circuit) and a method of testing the same. More particularly, the present invention relates to a novel micro-controller with a built-in test circuit and a method for testing the micro-controller. The method disclosed in the present invention includes three test modes: an external testing mode, an internal testing mode and an application-program-read mode, so as to improve the efficiency of testing a micro-controller.

2. Description of the Prior Art

Integrated circuits (ICs) have been widely used in a variety of items, from the everyday items to the technically more advanced items. The quality of an IC can closely affect the functions of a product incorporating it; therefore, the method of testing an IC to determine how well it performs its intended functions plays an important role.

The conventional IC test methods can be divided into two main kinds. FIG. 1 is a block diagram showing a first conventional IC test method, in which the test machine 10 sends out a control signal to an item (which is a micro-controller) to be tested 12 to perform a test. Then, the item to be tested 12 will send out a signal to the test machine 10 for comparison with an expected value so as to determine whether or not the item to be tested has the normal function. The test machine 10 simulates the actual operation of the item to be tested 12. When the item to be tested 12 needs more functions to be tested, the number of test functions provided in the test machine 10 has to be increased. This may cause a delay in performing the test and the test cost will be increased.

When a test is conducted on a micro-controller, the functions of the elements thereof are controlled with an internal program another problem arises because these elements contain built-in program units and at least a state machine. In other words, a different program operation will have a different output. If the conventional test method as shown in FIG. 1 is used, a potential problem in the [test] test can take place, because as soon as the built-in program in the micro-controller is altered, the test items and the test modes in the test machine have to be changed.

In testing a micro-controller, some manufacturers have developed a method, by which the test machine sends various instructions to the micro-controller to perform certain tests. Then, the test result from the micro-controller will be sent back to the test machine for comparison. However, when using the aforesaid method, the timing thereof has to be separated so as to cause two signals to be transmitted. In this way, it not only wastes time, but also causes the timing in the test machine to be different from the that in the micro-controller. This often caused a condition in that the test result from the test machine is all right but the actual function of an element would fail, and therefore the quality of an IC would be affected.

FIG. 2 is a block diagram of another conventional test method for testing Ics. As shown in FIG. 12, the item (i.e., a micro-controller) to be tested 12 includes a control circuit 18 for decoding an instruction and performing an instruction, and then sending out a signal to a test machine (test machine-I) 14. the "original control signal source" 24 is used for storing an application program. The "control signal generator" 22 is used for storing a test program and performing self-test. The test program will not be altered even when the application program is changed. During the test, during which the program memory is switched to the test program, the control signal generator 22 will have the item to be tested perform a self-test in accordance with the built-in test program. The test result, in the form of an output signal, will, through the control circuit 18, be sent to the test machine-I for comparison with a default value so as to detect whether or not the function of the item being tested is normal. In the aforesaid test method, the built-in test program in the control signal generator 22 will be difficult to change after it is designed, i.e., there would be a low test flexibility. For the cost sake, most of the space of a program memory is used for storing the application program, and only the rest of the memory space thereof is allocated for storing the test program. In most most cases, the testing conducted on of the test item will not be thorough, and the quality thereof will be compromised.

According to the aforesaid description, it is apparent that the conventional test method for a micro-controller has some drawbacks, and it should be improved.

SUMMARY OF THE INVENTION

The primary object of the present invention is to provide a novel micro-controller, and method for testing the same. The micro-controller contains a built-in test circuit, and is constructed that it can be tested according to an external testing mode, an internal testing mode, and an application-program read mode. In the present invention, three channels are provided for transmitting instructions to perform test so as to shorten the test time and prevent the problem of incomplete test which might affect the quality of an IC. In order to test different IC to know whether their functions are normal or not, the test method of the micro-controller has been designed with several channels and functions so as to let the user select a suitable one. According to the [test] functions to be tested, the inventor can design different function items, i.e., additional test items can be provided under an available space for a user.

DETAILED DESCRIPTION

Figure 1:
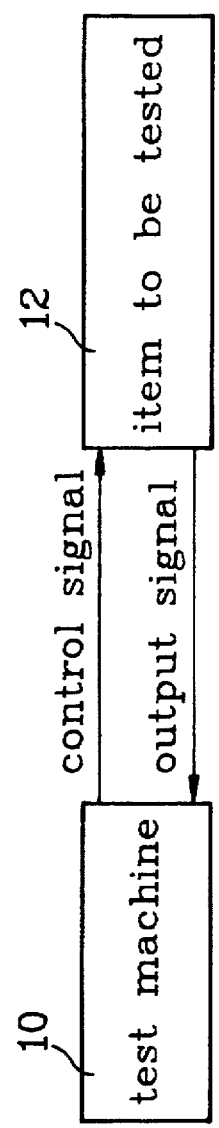
FIG. 1 is a block diagram, showing a conventional test method for an IC (integrated circuit).
Figure 2:
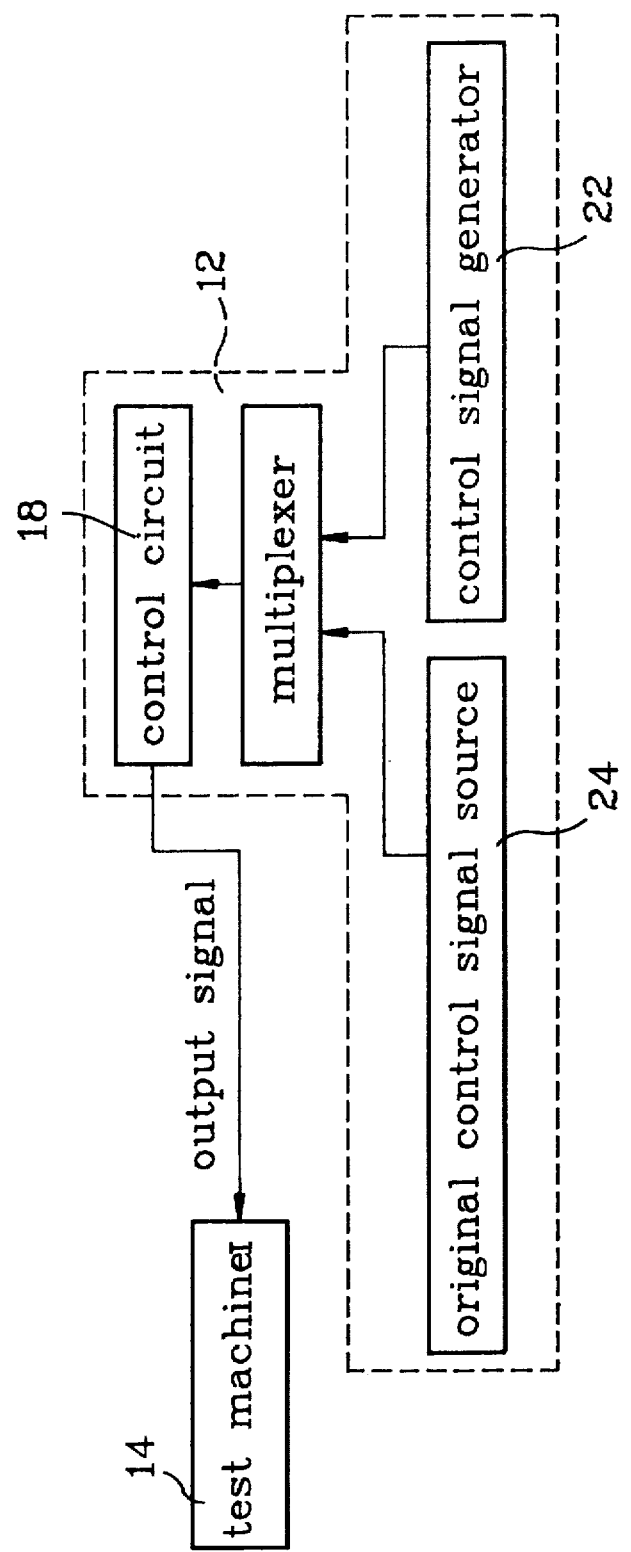
FIG. 2 is a block diagram, showing another conventional test method for an IC.
Figure 3:
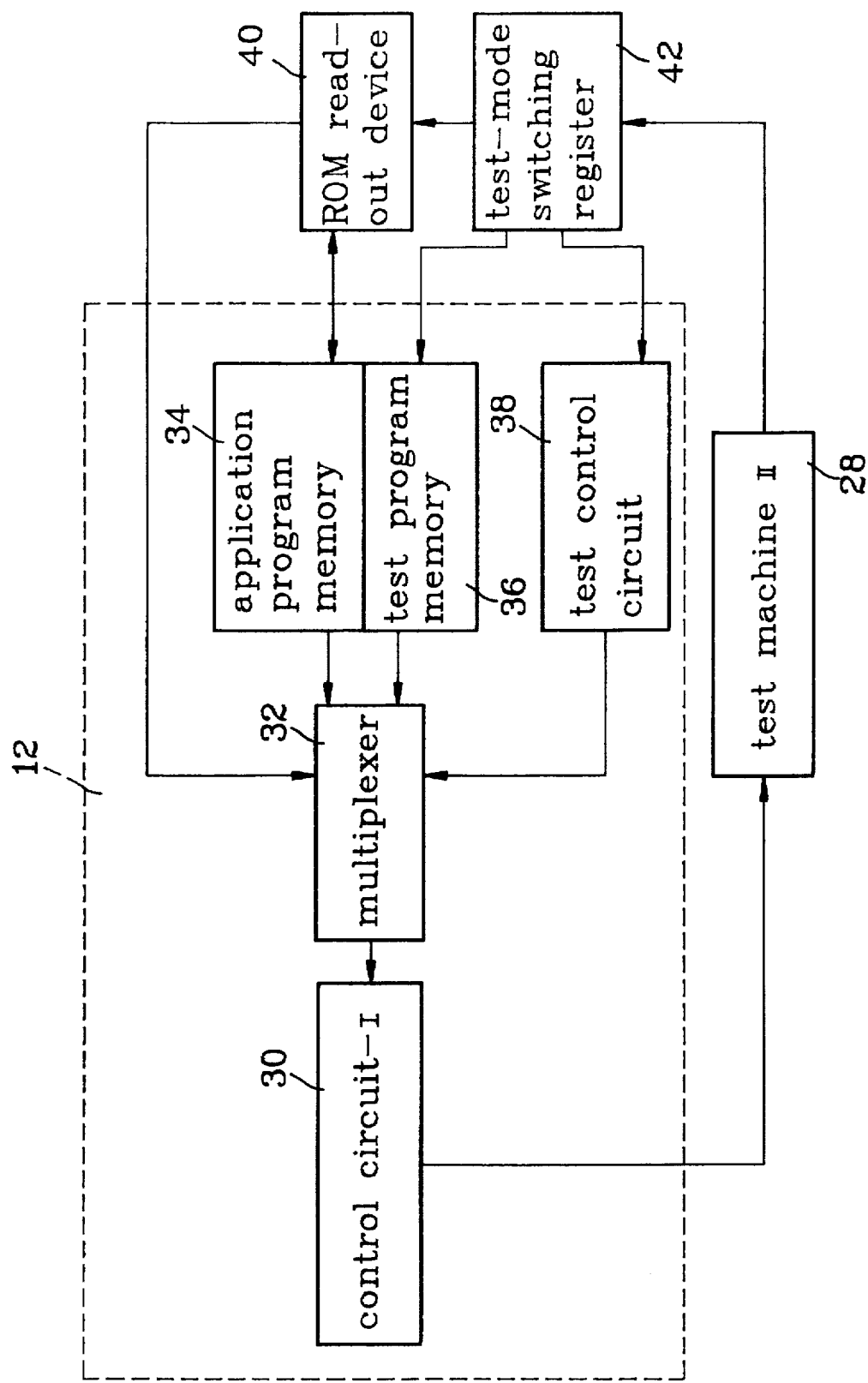
FIG. 3 is a block diagram showing an embodiment of test system according to the present invention.

In order to allow the Examiner to fully understand the objects, features and functions, the present invention is described in detail with the accompanying drawings as follows:

Referring to FIG. 3, the item (a micro-controller) to be tested 12 according to the present invention includes a test mode switching register 42 and a test control circuit 38, both of which constitute the main portion of an external test mode. The test-mode switching register 42 can receive an external instruction from a test instrument, such as a test machine-II 28 so as to select a test mode. I.e., it can switch to one of the three test modes. Other test modes can be added, if necessary. The test control circuit 38 is used for controlling the timing of an external instruction transmitted from a test instrument, and such outer instruction will also be sent to a control circuit-II 30, via a multiplexer 32. The control circuit-II 30 is used for decoding an instruction and executing a program instruction, as well as sending an output signal to the test instrument, such as a test machine-II 28, for comparison. The original memory of a micro-controller are divided into two parts, an application program memory 34 and a test program memory, both of which constitute the main portion of the internal test mode. The application program memory 34 is used for storing an application program; and a test program memory 36 is used for storing test programs. During the test, the memory of the micro-controller can be switched to the test program memory 36 so as to perform a self-test by means of one of the built-in test programs. The test program is designed in a modular type, i.e., the design is on the basis of a collection of single test functions so as to provide a flexible test function. The ROM read-out device 40 is used for reading the program code from the application program memory 34 to test whether the application program memory 34 can be read properly, so that the application program stored therein can be executed properly. The present invention can perform test by means of the three channels. In the event that the internal test mode does not provide sufficient test function or is not useful, the external test mode can be used instead, so as to overcome the problem of incomplete test. Therefore, the method according to the present invention not only can improve the test efficiency, but also can test an increased range of test items.

Figure 4:
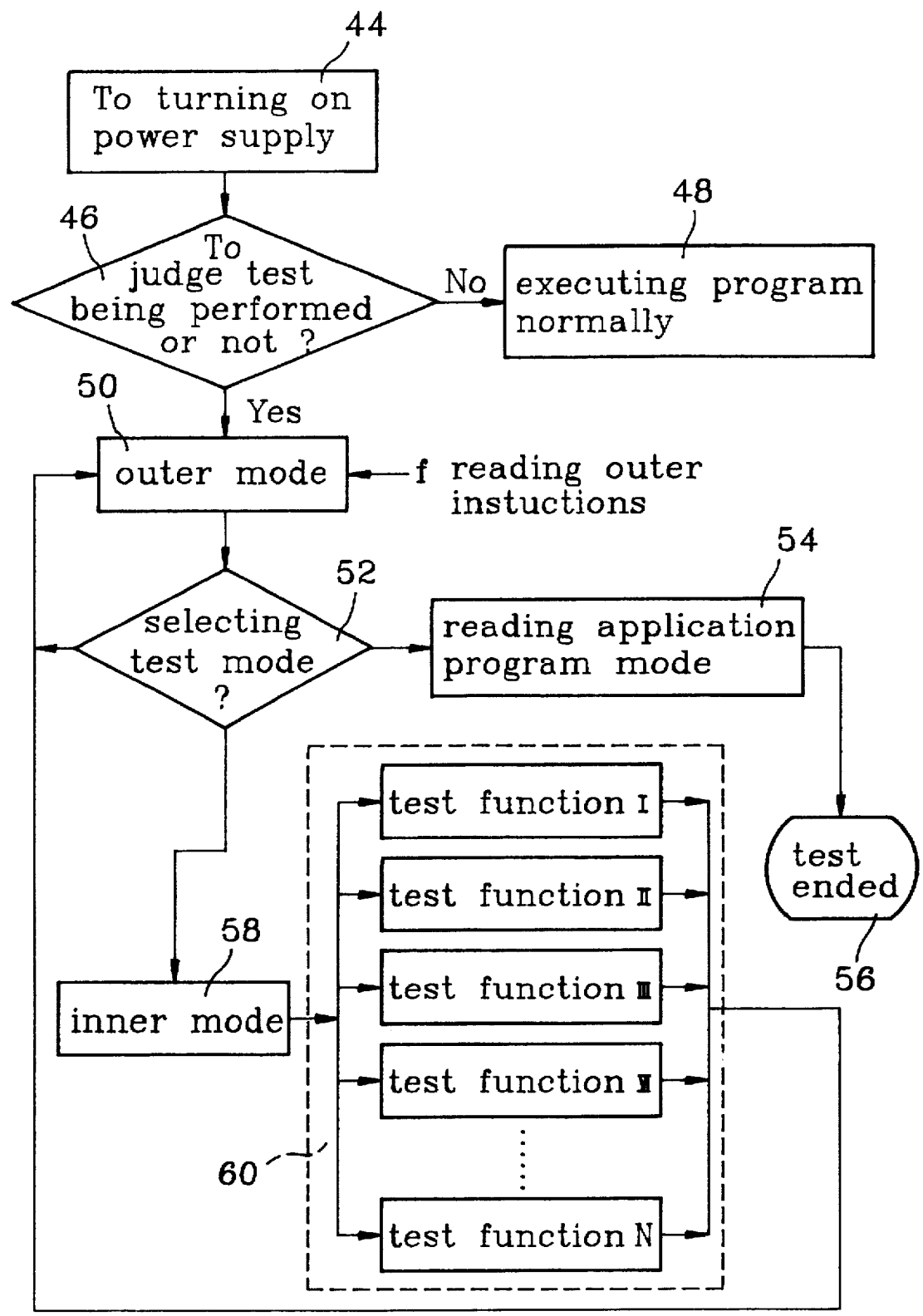
FIG. 4 is a flow chart of the test steps according to the present invention.

FIG. 4 illustrates a flow chart of an embodiment of the test procedure according to the present invention. The first step is to turn on the power supply 44. The next step is to determine whether or not a test is to be performed 46. If the answer is "NO", the item (i.e., the micro-controller) to be tested will enter the normal step of executing an application program 48. If, on the other hand, the answer is "YES", then a signal will be sent to a test-mode switching register to execute the external test mode 50. Then, the switching register reads the external instruction "f" to select a test mode from the three possible test modes 52. If an external test mode 50 is selected, the control circuit will transmit a signal accordingly. After the test is completed, an output signal will be returned to the test-mode switching register of the external test mode 50. If an internal test mode 58 is selected, a signal will enter the test program memory of the internal test mode 58 to select a test function. After the intended test is completed, an output signal will be returned to the test-mode switching register of the external test mode 50. After all the test functions are completed through the external test mode 50 and the internal test mode 58, an application-program-read mode 54 will be used for executing an instruction, and then the test is ended 56.

However, the aforesaid description is merely for the preferred embodiment according to the present invention, and should not be construed as a limit to the same; any change or modification to the claims of the present invention will be considered within the scope of the claims thereof.

We claim:

1. A test method for testing a micro-controller sending test results to a test instrument comprising the steps of:

(a) obtaining a micro-controller which contains:
      (i) a program memory containing an application program memory and a test program memory, and a test control circuit which is separate from said program memory;
      (ii) a test-mode switching register in cooperation with a multiplexer for selecting either said application program memory or said test program memory for execution, or bypassing said program memory by selecting said test control circuit; and
   (b) using a test instrument to send an instruction so as to subject said micro-controller to a test procedure according to an internal test mode, an external test mode, or an application-program-read mode, wherein:
      (i) during said external test mode, said test control circuit is selected so that said test is conducted externally in said test instrument;
      (ii) during said internal test mode, said test program memory is selected such that said test conducted is internally within said micro-controller;
      (iii) after said external and internal tests are conducted, said application-program-read mode is selected so that said application will be executed.

2. A test method for testing a micro-controller as claimed in claim 1, wherein said test procedure comprises the steps of:

(a) determining whether or not a test is to be performed, if "NO", executing said application program in a normal manner; if "YES", activating said test control circuit and said test-mode switching register;
   (b) reading an external instruction from said test instrument so as to select one of said test modes;
   (c) if said external test mode is selected, decoding and executing said external instruction, then sending a test result back to said test instrument and comparing said test result with a simulated result from said test instrument;
   (d) if said internal text mode is selected, then selecting, decoding and executing a test function from said test program, and sending a test result to said test instrument to compare against a default value;
   (e) after all intended tests are completed, causing said test instrument to to transmit another external instruction to switch said micro-controller to said application-program-read mode to test whether said application program is properly read and executed.

3. A test method for testing a micro-controller as claimed in claim 2, wherein when said test program memory contains a plurality of built-in test functions arranged in a modular form.

4. A micro-controller with a built-in test circuit, comprising:

(a) a test-mode switching register for receiving an external instruction from a test instrument to select a test mode and to switch said external instruction to a predetermined circuit according to a selected test mode;
   (b) a test control circuit electrically connected to said test-mode switching register for controlling a timing of said external instruction received from said test instrument, and transmitting out said said external instruction;
   (c) a multiplexer electrically connected to said test control circuit to receive an output signal of said test control circuit;
   (d) a control circuit electrically connected to said multiplexer for receiving an output signal therefrom, wherein said control circuit contains means for decoding and executing said output signal from said multiplexer and sending an executing result to said test instrument;

(e) a test program memory electrically connected to said multiplexer for storing a built-in test program, so as to allow said micro-controller to be tested in an internal mode;

(f) an application program memory for storing an application program;

(g) a ROM read-out device electrically connected to said multiplexer and said application program memory for reading out program codes from said application program memory to facilitate said test instrument to make a comparison.

5. A micro-controller with a built-in test circuit as claimed in claim 4 wherein when said test program memory contains a plurality of built-in test functions arranged in a modular form.

* * * * *